United States Patent [19]

Sagara et al.

[11] Patent Number: 4,948,599

[45] Date of Patent: Aug. 14, 1990

[54] CONTINUOUS PRODUCTION PROCESS OF CHEESE CURDS AND PRODUCTION PROCESS OF CHEESE THEREFROM

[75] Inventors: Kazuhiko Sagara; Kunio Ueda; Toshikazu Shimada, all of Yamanashi; Toshiaki Ishii, Tokorozawa, all of Japan

[73] Assignee: Snow Brand Milk Products Co., Ltd., Sapporo, Japan

[21] Appl. No.: 337,554

[22] Filed: Apr. 13, 1989

[30] Foreign Application Priority Data

Apr. 13, 1988 [JP] Japan .................................. 63-91118

[51] Int. Cl.$^5$ ...................... A23C 19/05; A23C 19/024
[52] U.S. Cl. ......................................... 426/40; 426/36; 426/582; 426/491
[58] Field of Search ...................... 426/36, 39, 40, 582, 426/34, 491

[56] References Cited

U.S. PATENT DOCUMENTS

| | | | |
|---|---|---|---|
| 3,616,536 | 11/1971 | Stenne | 31/46 |
| 3,653,919 | 4/1972 | Giddey et al. | 426/40 |
| 3,899,596 | 8/1975 | Stenne | 426/40 |
| 4,401,679 | 8/1983 | Rubin et al. | 426/36 |
| 4,689,234 | 8/1987 | Ernstrom et al. | 426/40 |
| 4,820,530 | 4/1989 | Moran et al. | 426/36 |

FOREIGN PATENT DOCUMENTS 2052121  4/1971  France .
41346  3/1977  Japan .
501932  11/1984  Japan .
88839  6/1986  Japan .
2138264  10/1984  United Kingdom .

OTHER PUBLICATIONS

XVI Intl. Dairy Congress, 1962, pp. 185–191.
Dairy Ind. (30), 9, 1965, pp. 709–710.
Dairy Engineering 80 (3) 1963, pp. 75–76, 92.
Dairy Engineering 80 (4), 1963, pp. 130–136.
Dairy Engineering 80 (5) 1963, pp. 161–154, 186.
Dairy Engineering 80 (6) 1963, pp. 207–208.

*Primary Examiner*—Marianne Cintins
*Attorney, Agent, or Firm*—Oblon, Spivak, McClelland, Maier & Neustadt

[57] ABSTRACT

Disclosed herein is a process for the continuous and quick production of cheese curds from milk, which comprises cooling a concentrated milk which has been obtained by ultrafiltration, adjusting its pH to 4.8–5.8 without coagulation, adding a milk-coagulating enzyme and/or a lactic acid bacterium starter, and the quickly heating the resultant mixture to 25°–84° C., whereby cheese curds are continuously formed, the heating of the mixture preferably being effected by heating a permeate separated out by the ultrafiltration and then mixing the heated permeate with the mixture. The thus-obtained cheese curds affording cheese having smooth texture.

4 Claims, No Drawings

CONTINUOUS PRODUCTION PROCESS OF CHEESE CURDS AND PRODUCTION PROCESS OF CHEESE THEREFROM

BACKGROUND OF THE INVENTION (1) Field of the Invention:

This invention relates to a process for quickly and continuously producing cheese curds useful in the production of varieties of cheese and also to a process for producing cheese from the cheese curds.

(2) Description of the Related Art:

Cheese curds have heretofore been produced by ingeniously using the actions of both a lactic acid bacterium starter and a milk-coagulating enzyme, more specifically, by adding both the lactic acid bacterium starter and the milk-coagulating enzyme to milk and conducting for a prescribed time both formation of the acid by the starter and a reaction by the enzyme. The acid is required for the formation of curds, while the reaction plays a role in the coagulation. This reaction is a primary enzymatic reaction and converts kappa casein to para-kappa casein. This conventional process however requires a long time from the addition of the lactice acid bacterium starter and milk-coagulating enzyme to the coagulation and molding, namely, for curd making. Moreover, it also requires strict control of curd-making conditions and skill, which are inherent to each variety of cheese. The conventional process is accompanied by another problem, that is, a production-related limitation is imposed on the conventional process so that for mass production, large facilities such as vats are needed and the production has to be conducted batchwise. With a view toward solving such problems, it has been attempted to continuously produce cheese curds, for example, by using concentrated milk or ultrafiltered milk or inducing low-temperature rennet action (the primary enzymatic reaction referred to above) as will be discussed below. Some of such attempts have been practiced on a production scale. Under the circumstances, none of these attempts have however successfully solved the aforementioned problems.

Namely, the production of cheese curds from UF (UF means ultrafiltration, which will be called "UF" hereinafter) concentrated milk goes back to the MMV process described in French Patent 2052121 published in 1971. It is reported in Japanese Language Laid-Open Publication (PCT) No. 501932/1984 that for the production of cheese curds from UF-concentrated milk, a continuous process has been developed by adding a lactic acid bacterium starter and a milk-coagulating enzyme to UF-concentrated milk, allowing it to coagulate successively in a certain number of vessels and then taking it out of the vessels, in other words, continuously conducting its coagulation in small batches, or conducting the coagulation on a belt conveyor or the like for a period substantially equal to the period required for the coagulation by the milk-coagulating enzyme.

Another approach is described, for example, in U.S. Pat. No. 4,689,234 issued Aug. 25, 1987, in which starting milk is partially acidified and then concentrated by UF or DF (DF means diafiltration, which will be called "DF" hereinafter), the pH of the thus-concentrated milk is lowered by a lactic acid bacterium starter, rennet is added to the concentrated milk, and the resultant mixture is charged in a continuous curds former to continuously form curds without heating.

These processes require coagulation time by a milk-coagulating enzyme. Since concentrated milk is caused to coagulate as is, they also require processing such as cutting and cooking to separate out trapped whey.

To cope with this problem, it has also been proposed to conduct the coagulation after lowering the water content of concentrated milk to a prescribed level by evaporation as disclosed in U.S. Pat. No. 4,401,679 issued Aug. 30, 1983 and Japanese Patent Publication No. 88839/1986.

In addition, Japanese Patent Publication No. 41346/1977 and U.S. Pat. No. 3,653,919 propose the formation of curds by causing rennet to act on evaporation-concentrated milk, which is not UF-concentrated milk, at 25° C. for about 12 minutes to conduct the primary enzymatic reaction sufficiently, lowering its temperature to 7° C. and then causing it to coagulate in a calcium chloride solution of 25°–45° C.

On the other hand, as processes for continuously producing curds, there are those using the action of rennet at low temperature such as the Dutch Ede process [J. Ubbels, J. T. van Linde: XVI Int. Dairy Congr. C, 185 (1962)], the U.S. Montoure process [J. E. Montoure: Proc. 31st. Ann. Mtg. Wash. State Univ. Inst. Dairy, 56–60 (1962)] and the process proposed by Berridge [N. J. Berridge: Dairy Engng., 80(3) 75, (4)130, (5)161, (6)207,(1963)]; those causing rennet at low temperature to act on concentrated milk such as the French Huntin-Stenne process [Dairy Ind., 30(9), 709 1965)]; and the "Paracurd" process disclosed in 1946 (see U.S. Pat. No. 3,899,596 and U.S. Pat. No. 3,616,536). In each of these processes, rennet is caused to act at low temperature on concentrated milk whose pH has been lowered to a prescribed level by a lactic acid bacterium starter, and the resultant mixture is mixed with a predetermined amount of hot water to heat the former.

These processes are also accompanied by problems such that a culture time is needed for the lactic acid bacterium starter, cooling is indispensable for the treatment with rennet and a time is required until the primary enzymatic reaction is completed.

The above-described processes for the continuous production of cheese curds all require a time sufficient to allow the primary enzymatic reaction by the lactic acid bacterium starter and milk-coagulating enzyme, said reaction playing a role in the coagulation, to proceed to a substantial extent. They also require a rather complex operation.

With a view toward reducing the time required for the culture of a lactic acid bacterium, it has also been proposed to conduct direct acidification by the addition of an acid in Japanese Patent Publication No. 37829/1973 and U.S. Patent Application Ser. No. 202,684. Although the acid is added at low temperature, they are accompanied by a problem which makes them improper for continuous operation, namely, they require heating in a stationary state.

SUMMARY OF THE INVENTION

Taking into consideration the above-described problems which are observed in the cheese producing processes using a milk-coagulating enzyme and a lactic acid bacterium starter, an object of this invention is to provide a process for producing from UF-concentrated milk cheese curds, which are useful for the production of varieties of cheese, in a very short time and moreover continuously without need for the time required for allowing the milk-coagulating enzyme to act for the formation of curds and the time required for the pH adjustment by the lactic acid bacterium starter, both of said times having been indispensable to date, and also to provide a process for the production of cheese from the cheese curds.

In one aspect of this invention, there is thus provided a process for the continuous production of cheese curds from milk. The process comprises cooling a concentrated milk, which has been obtained by ultrafiltration of milk or processed milk, to a temperature not higher than 15° C., adjusting the thus-cooled concentrated milk to pH 4.8–5.8, adding a milk-coagulating enzyme and a lactic acid bacterium starter to the pH-adjusted milk without coagulation, and then adding a permeate separated out by the ultrafiltration or its diluted solution with warm water to the cooled concentrated milk mixture to raise quickly the temperature to 25°–85° C. so that the resultant mixture is caused to coagulate and to form cheese curds.

In another aspect of this invention, there is also provided a process for the production of cheese, which comprises producing cheese from cheese curds, which have been obtained by the above process, by a technique known per se in the art.

In the process of this invention, the milk-coagulating enzyme and lactic acid bacterium starter do not take part in the formation of curds but are used only to permit suitable ripening or curing of varieties of cheese so that their flavors and textures may be improved.

Although the formation of curds can be achieved without such milk-coagulating enzyme and lactic acid bacterium starter in this invention, the resulting curds have physical properties not fully suited for the subsequent ripening of cheese. It is hence intended to improve both flavor and texture by allowing the milk-coagulating enzyme and lactic acid bacterium starter to exist in the stage prior to the occurrence of coagulation.

Accordingly, the present invention may still permit the production of cheese without one or both of the milk-coagulating enzyme and lactic acid bacterium starter in some instances. The process of this invention can therefore reduce or solve certain deficiencies which are observed in the course of development of new varieties of cheese or in certain conventional cheeses.

DETAILED DESCRIPTION OF THE PREFERRED EMBODIMENTS

In the present invention, milk, processed milk composed principally of milk, or the like is first of all sterilized and cooled as a raw material by a method known per se in the art. It is then subjected to both UF and DF or UF alone, whereby it is concentrated to give concentrated milk of about twofold to sixfold concentration. After cooling the concentrated milk to 15° C. or lower, an acid such as lactic acid or citric acid is added so that its pH is adjusted to 4.8–5.8. Added next are a lactic acid bacterium starter, a milk-coagulating enzyme, etc. without formation of curds, which are selected depending on the kind of cheese desired. To the resulting milk mixture a permeate separated out by the ultrafiltration or its diluted solution is so added as to heat the milk mixture quickly to 25°–85° C., whereby the concentrated milk is caused to coagulate and cheese curds are hence obtained.

The above quick heating may be effected by indirect quick heating, for example, by bringing the mixture as a thin film into contact with a heating plate or exposing the mixture to electromagnetic waves. It is however preferred to quickly heat the mixture to induce coagulation and formation of curds by heating a permeate, which has been discharged and separated out by the ultrafiltration, to 45°–95° C. and then adding the thus-heated permeate to the mixture so that the resulting mixture has a temperature of 25°–85° C. immediately after the mixing. Features of a production process of cheese curds according to a preferred embodiment of this invention reside in that the pH of UF-concentrated milk is adjusted to 4.8–5.8, a milk-coagulating enzyme and a lactic acid bacterium starter are added immediately before mixing of a heated permeate to the UF-concentrated milk for the heating of the latter, and the heated permeate is then added to the resulting mixture to heat the mixture to 25°–70° C., whereby the concentrated milk is caused to coagulate to provide cheese curds suitable for use in the production of cheese.

A permeate discharged by ultrafiltration can be used as the permeate either as is or after dilution with water. The permeate contains whey components derived from the starting milk. Its dilution with water therefore makes it possible to have desired amounts of whey components, which have been separated out in the course of the concentration, returned to the concentrated milk. It is also feasible to use an acidified permeate mixed with warm water, so that the formation of cheese curds may be promoted. It is also possible to add calcium chloride to the permeate.

In the above process, the degree of concentration, the degree of DF, the kind and amount of the acid to be added, the amount of the milk-coagulating enzyme, the amount and temperature of water to be added for heating the permeate, the amount of the permeate to be mixed, the temperature of the curds, etc. should be chosen suitably depending on the kind of cheese.

It may be contemplated of adding a lactic acid bacterium starter before the UF concentration so that the pH of the resulting concentrated milk can be lowered to a prescribed level in advance while the UF concentration is carried out. So long as the speeds of the concentration and acidification can be controlled, this method can also achieve both concentration of the lactic acid bacterium starter and demineralization and is hence advantageous.

As additives to the concentrated milk, may be mentioned those to be added to adjust the composition, such as calcium chloride, salt, mold, yeast, proteolytic enzyme, steatolytic enzyme and/or fermentation regulator (potassium nitrate) as well as other foods such as fruits, vegetables, or meats, or mixtures thereof.

The curds, which have been obtained by coagulating concentrated milk as described above, are then subjected to a further processing depending on the variety of cheese which may range from fresh-type cheese to fermented and ripened cheese. The thus-processed curds are filled in molds, followed by salting, fermentation and ripening in a manner known per se in the art so that cheese good in both flavor and texture can be obtained.

As has been described above, according to the preferred embodiment of this invention, curds are formed by adding a milk-coagulating enzyme and a lactic acid bacterium starter immediately before mixing a heated permeate or its water-diluted solution with pH-adjusted UF-concentrated milk as a starting material for cheese. It is hence possible to significantly shorten the curd making time which includes the time for the acidification of milk, the primary enzymatic reaction time for the coagulation by rennet, the coagulation time and the whey-discharging time. Since the curds can be formed into flakes or the like, it is possible to eliminate the difficulty which would otherwise be encountered upon discharging of whey. Accordingly, curds are formed quickly and continuously. Varieties of cheese can therefore be economically produced by simple facilities provided that conditions such as the degree of concentration, the degree of DF, the kind of the acid, the amount of rennet, the pH level, the temperature of the curds, post-processing of the curds, etc. are suitably chosen.

By adjusting UF-concentrated milk to a prescribed pH with an acid and then performing its quick heating and coagulation, the present invention makes it possible to produce variety of cheese, ranging from fresh cheese to fermented and ripened cheese, interchangeably without wasting time in any of the production steps. The present invention has therefore made it possible to promptly produce cheese curds in a continuous operation and is hence extremely economical and advantageous for the production of cheese.

This invention will hereinafter be described specifically by the following examples, in which all designations of "%" indicate "wt. %" unless otherwise specifically indicated.

EXAMPLE 1:

Whole milk (400 kg; fat content: 3.5%) as a starting material was subjected to plate pasteurization at 75° C. for 15 seconds, and its temperature was adjusted to 55° C. The milk was then charged into an ultrafiltration apparatus (Rhone Poulanc Type; 8.8 m$^2$). Concentrated milk of about fourfold concentration was continuously taken out of the apparatus and cooled to 15° C. Thereafter, 0.8% of lactic acid (fivefold dilute solution), 5% of a mixed lactic acid bacterium starter containing heat-resistant *L. bulgaricus* and *S. thermophilus,* and 0.003% of Hansen's rennet as a milk-coagulating enzyme were added under mixing through metering pumps respectively to the concentrated milk, whereby the concentrated milk was adjusted to pH 5.3. Along with a permeate discharged from the ultrafiltration apparatus, the concentrated milk mixture was then fed at the same flow rate into a curd-forming mixer. The resulting mixture was heated to about 45° C. to quickly form curds. The curds were separated from the curd mixture, processed by a kneader into a plastic-like form, filled in molds, cooled, salted and then packaged, thereby obtaining 50 kg of Mozzarella cheese having good flavor, texture and heat-melting property.

In addition, salted curd blocks obtained in a similar manner were dried, smoked and ripened at 10° C., thereby obtaining 48 kg of Provolone-type cheese which had rich flavor and especially, smooth texture.

Incidentally, it took about 10 minutes from the discharge of the concentrated milk from the ultrafiltration apparatus until its filling in molds. Even when the ultrafiltration apparatus was operated at fourfold concentration and 100 kg/hr, it took only about 1.5 hours from the initiation of pasteurization of the starting milk until the packaging as cheese.

EXAMPLE 2:

While continuously obtaining UF-concentrated milk of 3.5-fold concentration from 400 kg of modified milk (fat content: 3.2%) as a starting material and cooling the concentrated milk to 10° C. in a manner similar to Example 1, a mixed lactic acid bacterium starter similar to that used in Example 1, 0.5% of citric acid (as a 10% solution) and 0.005% of rennet (diluted 40-fold with water) containing 0.001% of potassium nitrate were added under mixing through metering pumps respectively. The concentrated milk mixture whose pH had been adjusted to 5.6 was fed along with a mixture of a permeate and warm water, which had been discharged from the ultrafiltration apparatus upon production of the concentrated milk, into a curd-forming mixer. The resultant mixture was heated to about 40° C., thereby quickly causing coagulation to form curds. The curds were separated from the curd mixture, filled in molds, and thereafter subjected to pressing, salting and 10° C. ripening in a manner known per se in the art. As a result, 46 kg of Gouda-type cheese good in both flavor and texture was obtained.

EXAMPLE 3:

Similarly to Example 1, concentrated milk of about 2.5-fold concentration was added under mixing with 6% of the mixed lactic acid bacterium starter, 0.004% of rennet and 0.5% of citric acid so that the pH of the resulting milk mixture was 5.2. The mixture was then mixed with an equal amount of an ultrafiltration permeate of 65° C. to quickly form a curd mixture. The curd mixture was poured directly into hoops placed on a grating. On the following day, the curd mixture was salted and inoculated with a mildew. The curd mixture was ripened at 20° C. and 95% RH for 4 days and thereafter at 10° C. for 30 days, thereby obtaining 50 kg of mildew-ripened cheese (Camembert type).

Results of some traditional processes as comparative examples will next be tabulated along with the results obtained in the above examples.

TABLE

|  | Production process | Preparation time of curd from starter addition until filling in molds | Recovery rate of solids | Organoleptic evaluation compared to product by traditional process | Yield of green cheese |
| --- | --- | --- | --- | --- | --- |
| Brobolone type | Comp. Ex. 1 | 5 hours | 48.78% | Smooth texture | 9.6% |
|  | Ex. 1 | 0.2 hour | 51.47% |  | 12.0% |
| Gouda type | Comp. Ex. 2 | 3.5 hours | 48.24% | Ripening was somewhat slower but flavor was the same. | 8.3% |
|  | Ex. 2 | 0.2 hour | 50.37% |  | 11.5% |
| Camembert type | Comp. Ex. 3 | 4.5 hours | 45.47% | Texture was somewhat dense and flavor was | 14.5% |
|  | Ex. 3 | 0.2 hour | 46.52% |  | 15.0% |

| Production process | Preparation time of curd from starter addition until filling in molds | Recovery rate of solids | Organolyptic evaluation compared to product by traditional process | Yield of green cheese |
|---|---|---|---|---|
| | | | flat | |

Note 1:
Process of Comp. Ex. 1 ... The production process described on page 223 of F. Kosikowski: Cheese and Fermented Milk Food, 2nd edition, F.V. Kosikowski and Associate, U.S.A., (1978).
Process of Comp. Ex. 2 ... ibid., 289.
Process of Comp. Ex. 3 ... ibid., 342.

Note 2:
"Green cheese" means unripened cheese on the day following the formation of curds.

$$\text{Recovery rate of solids, \%} = \frac{\text{Cheese yield, kg} \times \text{Solid content of cheese, \%}}{\text{Amount of starting milk, kg} \times \text{Milk solids, \%}} \times 100$$

$$\text{Yield of green cheese, \%} = \frac{\text{Yield of green cheese, kg}}{\text{Amount of starting milk, kg}} \times 100$$

We claim:

1. A process for the continuous production of cheese curds from milk, which comprises cooling a concentrated milk, which has been obtained by ultrafiltration of pasteurized milk or pasteurized processed milk, to a temperature not higher than 15° C., adjusting the cooled concentrated milk to pH 4.8-5.8, adding a milk-coagulating enzyme and a lactic acid bacterium starter to the cooled concentrated milk without coagulation, and then adding a heated permeate which has been separated out by the ultrafiltration to the cooled concentrated milk mixture to raise the temperature of the resultant mixture to 25-85° C. to thereby coagulate the milk and to form cheese curds, the temperature of the heated permeate being sufficiently high so that the temperature of the resultant mixture is at 25-85° C.

2. The process of claim 1, wherein warm water is added to the permeate to obtain a diluted permeate of sufficiently high enough temperature and the diluted permeate is added to the cooled concentrated milk.

3. A process for the production of cheese, which comprises producing cheese from cheese curds, which have been obtained by the process of claim 1 or of claim 2.

4. The process of claim 1, wherein the permeate is heated to 45-95° C. to obtain the heated permeate.

* * * * *